United States Patent [19]

Noyori

[11] Patent Number: 4,764,884
[45] Date of Patent: Aug. 16, 1988

[54] FAILURE DETECTING APPARATUS OF A CONTROL UNIT FOR A VEHICLE

[75] Inventor: Takahiro Noyori, Hamamatsu, Japan

[73] Assignee: Suzuki Jidosha Kogyo Kabushiki Kaisha, Shizuoka, Japan

[21] Appl. No.: 859,118

[22] Filed: May 2, 1986

[30] Foreign Application Priority Data

May 14, 1985 [JP] Japan ............................ 60-102460

[51] Int. Cl.⁴ ...................... G06F 15/20; G01R 31/02
[52] U.S. Cl. ................................. 364/552; 123/494;
324/422; 340/635; 340/644; 364/431.11;
364/481
[58] Field of Search ............... 364/431.15, 431.11,
364/481, 483, 550, 551, 552; 340/635, 639, 644,
654, 664; 324/422; 371/15; 123/494

[56] References Cited

U.S. PATENT DOCUMENTS

| | | | |
|---|---|---|---|
| 3,340,465 | 9/1967 | Clark | 324/422 |
| 4,586,144 | 4/1986 | Fukumoto | 364/550 |
| 4,599,696 | 7/1986 | Takahashi | 123/494 |
| 4,634,842 | 1/1987 | Payne | 340/644 |

FOREIGN PATENT DOCUMENTS 54-114270  9/1979  Japan.
58-85340   5/1983  Japan.
58-158346  9/1983  Japan.

Primary Examiner—Parshotam S. Lall
Assistant Examiner—Kevin J. Teska
Attorney, Agent, or Firm—Flynn, Thiel, Boutell & Tanis

[57] ABSTRACT

A control unit for use in a vehicle includes a failure detecting apparatus for detecting failures of solenoids which are used for various kinds of controls of the vehicle. The failure detecting apparatus includes a solenoid driving circuit which sequentially supplies currents to the solenoids, and includes an input circuit which receives an output signal from each solenoid which operates normally. When a solenoid doesn't operate normally, no output signal is returned. Therefore, a control circuit of the apparatus detects the absence of the output signal from such solenoid and thereby determines that this solenoid is defective. When the failure of a solenoid is thus detected, the control circuit outputs an alarm signal to the alarm indicator through the alarm driving circuit, the alarm signal identifying the defective solenoid. A light emitting diode corresponding to the defective solenoid may then be lit to visually indicate the failure.

8 Claims, 3 Drawing Sheets

FAILURE DETECTING APPARATUS OF A CONTROL UNIT FOR A VEHICLE

FIELD OF THE INVENTION

The present invention relates to a failure detecting apparatus of a control unit adapted for use in a vehicle and, more particularly, to a failure detecting apparatus which sequentially supplies currents to various kinds of solenoids prior to starting the engine and then checks their outputs in order to detect a failure.

BACKGROUND OF THE INVENTION

There are control units which are adapted for use in vehicles and which control fuel injection, ignition timing and the like using a microcomputer. In such control units, when a failure occurs, it is difficult to promptly find out the location of the failure; therefore, the failure is detected using the microcomputer.

FIG. 1 is a diagram showing a conventional example of a failure detecting apparatus of a control unit used in a vehicle.

Hitherto, in such a failure detecting apparatus, currents are respectively supplied to a plurality of solenoids $S_i$ (i=1 to n), and outputs therefrom are fed back to a control unit 1 in the running range of the vehicle in which these solenoids operate, and a failure of the solenoids can be detected in dependence on the presence or absence of the outputs of the solenoids.

However, in such a failure detecting apparatus, when the vehicle is in a predetermined running state, the solenoid corresponding to this running state is checked. Therefore, in a case where the vehicle runs in only a running range where this solenoid doesn't operate, or in a case where it takes a considerably long time until the vehicle enters the running state in which such solenoid can operate, there is the problem that the failure of this solenoid cannot be detected.

When detection of the failure of a solenoid is delayed, or when the failure cannot be detected, the control of exhaust gas components, fuel consumption, and drivability may deteriorate. Further, the braking system and steering system can fail, and there is also a possibility of the occurrence of a serious accident.

There is also a failure detecting apparatus in which the solenoids are checked in parallel. However, in this apparatus, plural I/O ports of the control unit are needed to input checking signals, as a result of which there is a problem because the degree of freedom in design is limited.

SUMMARY OF THE INVENTION

It is an object of the present invention to provide a failure detecting apparatus of a control unit adapted for use in a vehicle which sequentially supplies currents to various kinds of solenoids prior to starting the engine and checks their outputs to thereby detect a failure.

According to the present invention, this object is accomplished by providing a failure detecting apparatus of a control unit usable in a vehicle for detecting failures of a plurality of solenoids controlling various functions of the vehicle, including a solenoid driving circuit which can supply currents to the solenoids and an input circuit which can receive an output signal as a return signal from each solenoid which operates normally. A control circuit is provided for outputting a current-supply command signal to the solenoid driving circuit to cause it to supply the currents to the solenoids in accordance with a predetermined sequence when a start signal is inputted to the control circuit from an ignition switch, for receiving through the input circuit, the return signals from the solenoids supplied with the currents, for deciding that a solenoid which doesn't output any return signal is defective, and for then outputting an alarm signal. The apparatus also includes an alarm driving circuit for outputting a signal in response to the alarm signal of the control circuit, and an alarm indicator which includes a plurality of light emitting diodes (LEDs) respectively corresponding to the solenoids and which lights up the LED corresponding to the solenoid which is defective in response to the alarm signal from the control circuit. The input circuit is preferably a single input/output port.

The above and other objects and features of the present invention will be more clearly understood from the following description, with reference to the accompanying drawings.

BRIEF DESCRIPTION OF THE DRAWINGS

An embodiment of the present invention is described in detail hereinbelow with reference to FIGS. 2-4. In the drawings.

DETAILED DESCRIPTION

Figure 1:
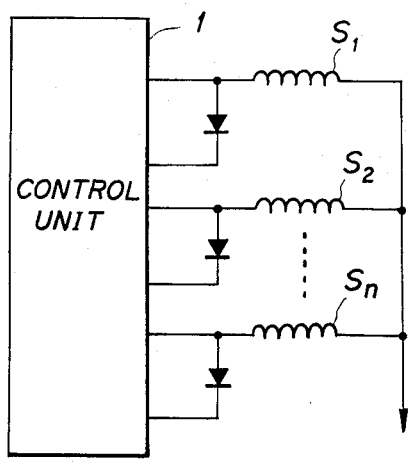
FIG. 1 is a block diagram showing an example of a conventional failure detecting apparatus of a control unit adapted for use in a vehicle.
Figure 2:
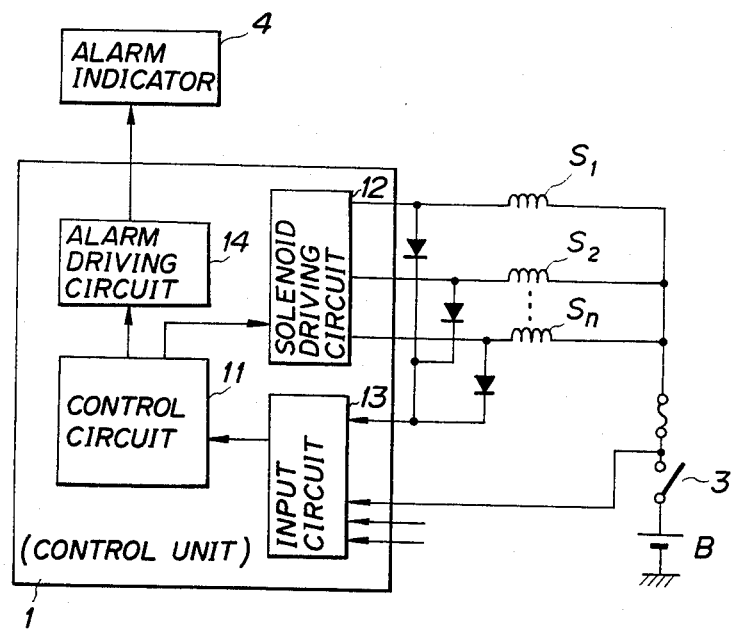
FIG. 2 is a circuit block diagram showing a failure detecting apparatus of a control unit adapted for use in vehicles and embodying the present invention.

In FIG. 2, reference numeral 1 denotes the control unit; 3 is an ignition switch; 4 is an alarm indicator; and $S_1$ to $S_n$ are respective solenoids.

The control unit 1 controls fuel injection, ignition timing, and the like for the engine of the vehicle, and in the preferred embodiment includes a conventional one-chip microcomputer (The name of the manufacturer of the one-chip microcomputer is HITACHI SEISAKU-SHO K.K. The address of the manufacturer is 4-6 Surugadai, Kanda, Chiyoda-ku, Tokyo 101 JAPAN. The manufacturer's part number for the chip is HD6805S1, and also the manufacturer's part numbers HD6805WO and HD6305VO could be used for the chip.). FIG. 2 shows only the components of the control unit 1 which are necessary for an understanding of the present invention, in particular a control circuit (serving as a failure detecting circuit) 11, a solenoid driving circuit 12, an input circuit 13, and an alarm driving circuit 14.

The solenoid driving circuit 12 has n outputs which are connected to the solenoids $S_1$ to $S_n$, respectively. These solenoids are used for various kinds of control of the vehicle and can include, for example, an F/C solenoid (the solenoid which controls the fuel injection system), an A/F solenoid (the solenoid which controls the air-fuel ratio), an ID-UP solenoid (the solenoid of the idling-up), a vent solenoid (the solenoid which controls the ventilation valve for refreshing the air of an interior), and the like. When currents are supplied to the solenoids $S_i$ to $S_n$, output signals are returned from the normal solenoids (that is, the solenoids which are in the normal operative state) to the control circuit 11 through the input circuit 13.

In particular, each solenoid is connected to a single input terminal of the input circuit 13 through a respective diode.

Figure 3:
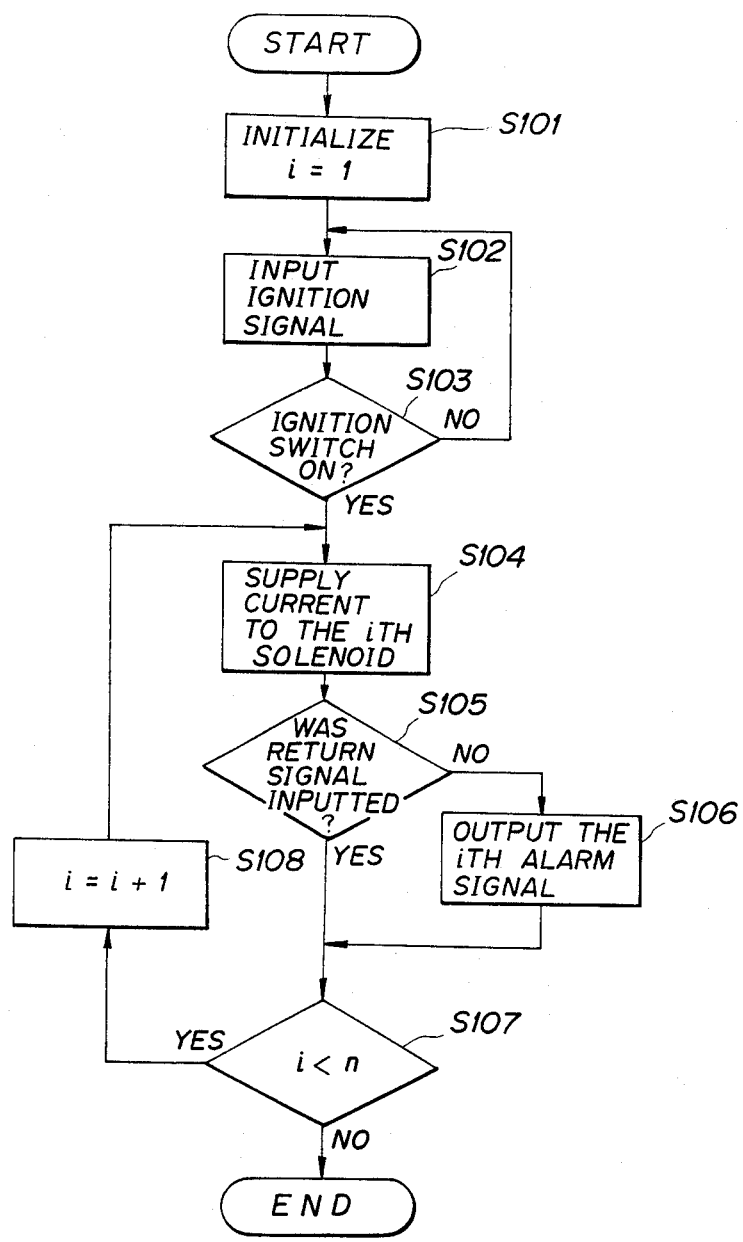
FIG. 3 is a flowchart depicting the operation of the control circuit in the apparatus shown in FIG. 2.

The control circuit 11 detects a failure in accordance with the flowchart shown in FIG. 3. In particular, the control circuit 11 is first initialized (by setting i=1) in step S101, and then inputs the state of an ignition signal from the ignition switch 3 (step S102). A test of the ignition signal is made in step S103 to see if the ignition switch has been turned on or not. The ignition signal is a digital "1" level when the ignition switch 3 is turned on, and a digital "0" level when the switch is off.

When the ignition switch 3 is turned on, the first solenoid $S_1$ is supplied with a current (step S104). A check is then made to see whether an output signal (i.e. a return signal) from the energized solenoid $S_1$ has been fed back to the input circuit 13 in the control unit 1 or not (step S105). In the event no return signal is fed back, an alarm signal is outputted through the alarm driving circuit 14 to the alarm indicator 4 (step S106).

In a manner similar to that described above, this checking operation is sequentially performed with respect to the solenoids $S_2$ to $S_n$ (steps S104 to S108).

An output from the control circuit 11, therefore, can be supplied to the alarm indicator 4 through the alarm driving circuit 14. The alarm indicator 4 serves, for example, to warn of a failure (or failures) of the solenoids $S_1$ to $S_n$ and, preferably, includes n light emitting diodes (LEDs) arranged in correspondence to the n solenoids $S_1$ to $S_n$, respectively. The LED corresponding to the defective solenoid is lit.

Figure 4:
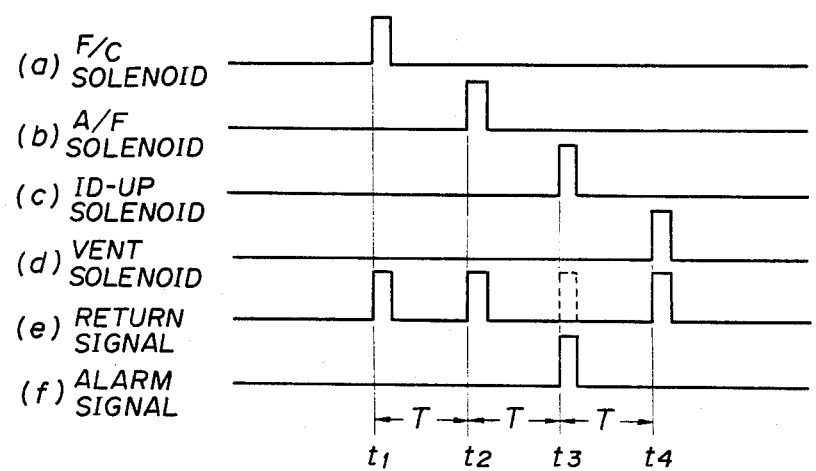
FIG. 4 is a waveform diagram showing electrical signals which can occur during operation of the apparatus of FIG. 2.

The operation of the failure detecting apparatus of the control unit adapted for use in vehicles and embodying the invention will now be described with reference to the waveform diagram of FIG. 4.

In this case, a check for failure of four solenoids (an F/C solenoid, A/F solenoid, ID-UP solenoid, and vent solenoid) will be explained as an example.

When the start signal is inputted from the ignition switch 3, the control circuit 11 sequentially outputs current-supply command signals to the solenoids $S_1$ to $S_n$ at regular intervals of T through the solenoid driving circuit 12 (FIGS. 4(a) to 4(d)). Thus, these solenoids are sequentially energized.

The control circuit 11 sequentially checks for the occurrence of the return signals from the respective solenoids through the input circuit 13 (FIG. 4(e)). When no return signal is detected from a given solenoid, the control circuit outputs an alarm signal through the alarm driving circuit 14, for example at time $t_3$ in the exemplary situation shown in FIG. 4(f). Then, the alarm indicator 4 lights up the LED corresponding to the vent solenoid, which in this example was found to be defective, thereby providing a warning of the failure.

As described in detail above, according to the present invention currents are sequentially supplied to various kinds of solenoids before the engine is started, and outputs from the solenoids are returned to the control circuit, which checks for a failure. Consequently, the failure of a solenoid can be definitely checked before the vehicle runs.

In addition, since the failure detecting apparatus sequentially checks the solenoids, it is sufficient to use only one input port to monitor the return signals, which provides an increased degree of freedom in designing the control unit.

The present invention is not limited to the foregoing embodiment, since many modifications and variations, including the rearrangement of parts, are possible within the spirit and scope of the appended claims.

What is claimed is:

1. A failure detecting apparatus of a control unit for a vehicle, said apparatus detecting failures of solenoids used to control various functions of the vehicle, comprising:

a solenoid driving circuit which selectively supplies currents to said solenoids;

an input circuit for receiving an output signal as a return signal from each of the solenoids which is in a normal operating state;

an ignition switch which outputs an engine start signal when it is turned on;

control circuit means for outputting to said solenoid driving circuit command signals which cause said solenoid driving circuit to supply currents to the solenoids in a predetermined sequence when said start signal is inputted from said ignition switch to said control circuit means, for receiving through said input circuit the return signals from said solenoids supplied with the currents, for determining that any said solenoid which fails to output a return signal in response to the application of current thereto is defective, and for outputting an alarm signal when a defective solenoid is detected; and alarm indicating means for indicating the solenoid which is defective in response to said alarm signal from said control circuit.

2. A failure detecting apparatus according to claim 1, wherein said input circuit has a single input port which receives each said return signal.

3. A failure detecting apparatus according to claim 1, wherein said control unit includes an alarm driving circuit for outputting said alarm signal from said control circuit means to said alarm indicating means.

4. A failure detecting apparatus according to claim 3, wherein said alarm indicating means includes a plurality of light emitting diodes which each correspond to a respective one of said solenoids, a respective one of said light emitting diodes which corresponds to one of said solenoids which is determined to be defective being lit in response to the alarm signal from said alarm driving circuit.

5. A failure detecting apparatus according to claim 1, wherein said control circuit means is a one-chip microcomputer.

6. A failure detecting apparatus for a vehicle which has a plurality of components to be controlled, comprising: a plurality of solenoids which are each connected to and control a respective one of said components; a solenoid driving circuit having a plurality of outputs which are each connected to and control a respective said solenoid; an input circuit having an input; a plurality of diodes which each have an anode and a cathode, the anode of each said diode being connected to a respective said output of said solenoid driving circuit, and said cathodes of said diodes all being connected to each other and to said input of said input circuit; and control means cooperable with said solenoid driving circuit and said input circuit for causing said solenoid driving circuit to sequentially produce a respective output signal at each said output thereof, and for verifying that a return signal is received at said input of said input circuit in response to each said output signal.

7. A failure detecting apparatus according to claim 6, including an ignition switch which outputs an engine start signal when actuated, and wherein said control means is responsive to said ignition switch for initiating said sequential production of said respective output signals in response to actuation of said ignition switch.

8. A failure detecting apparatus according to claim 6, including an alarm indicating arrangement which is operatively coupled to and is controlled by said control means, said control means causing said alarm indicating arrangement to produce an alarm signal in response to the detection of the absence at said input port of a signal corresponding to one of said output signals.

* * * * *